United States Patent [19]

Andrews

[11] Patent Number: 4,652,424

[45] Date of Patent: Mar. 24, 1987

[54] EXTENDED LIFE NUCLEAR CONTROL ROD

[75] Inventor: Mena G. Andrews, Newington, Conn.

[73] Assignee: Combustion Engineering, Inc., Windsor, Conn.

[21] Appl. No.: 732,121

[22] Filed: May 9, 1985

[51] Int. Cl.$^4$ .................................................. G21C 7/10
[52] U.S. Cl. ..................................... 376/333; 376/327; 376/429; 376/420
[58] Field of Search ............... 376/327, 333, 428, 429, 376/419, 420

[56] References Cited

U.S. PATENT DOCUMENTS

| | | | |
|---|---|---|---|
| 2,984,613 | 5/1961 | Bassett | 376/429 |
| 3,009,869 | 11/1961 | Bassett | 376/419 |
| 3,510,398 | 5/1970 | Wood | 376/327 |

FOREIGN PATENT DOCUMENTS

| | | | |
|---|---|---|---|
| 223903 | 11/1957 | Australia | 376/333 |
| 591408 | 1/1960 | Canada | 376/327 |
| 2012731 | 3/1970 | France | 376/333 |

*Primary Examiner*—Harvey E. Behrend
*Attorney, Agent, or Firm*—John H. Mulholland

[57] ABSTRACT

A control rod for a nuclear fuel assembly has structures formed of boron carbide mounted inside it. The boron carbide structures are provided deformable members between them which will deform at operating temperatures to accommodate the dimensional increase of the boron carbide structures and reduce the level of deformable stress on the rod cladding.

5 Claims, 2 Drawing Figures

U.S. Patent  Mar. 24, 1987  4,652,424
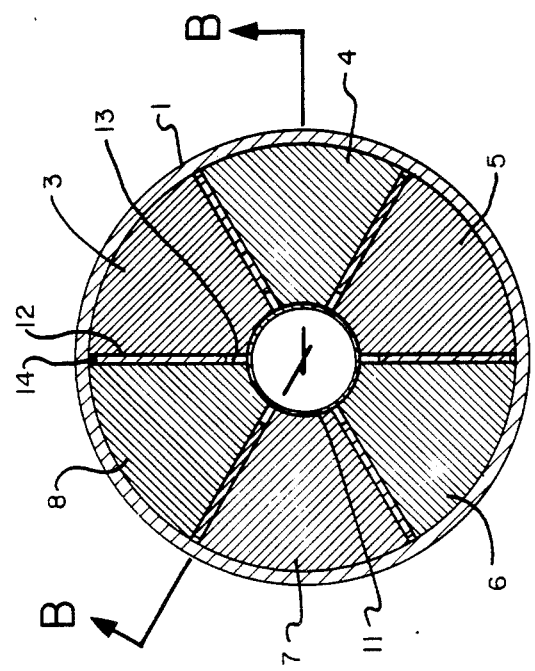
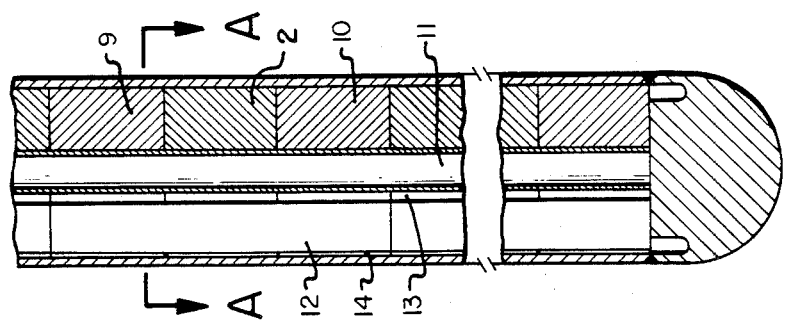

EXTENDED LIFE NUCLEAR CONTROL ROD

TECHNICAL FIELD

The present invention relates to control rods used in a nuclear reactor to absorb neutrons. More particularly, the invention relates to the internal arrangement of boron carbide segments in the control rod to compensate the dimensional expansion of the segments.

BACKGROUND ART

The absorbent material used in many control rods for LWR's and FBR's is boron carbide ($B_4C$). Boron carbide has a high cross section for absorption of neutrons and maintains its properties at reactor operating temperature. It is the present practice to form boron carbide either into cylindrical pellets that are subsequently loaded into cladding tubes, or it is loaded into similar cladding tubes in powder form by vibro-compaction techniques. Recent experience in a boiling water reactor has revealed the key limitation to the mechanical integrity of these control rods, the swelling behavior of the boron carbide. Neutrons absorbed on the outer diameter of the boron carbide material cause a volumetric increase in the boron carbide and a growth of the pellet, or compacted powder, in an arrangement which bears upon and stresses the metal cladding (usually stainless steel or inconel). Dimensional changes have warped the tubes or even ruptured the cladding tube which leads to a loss of function for the control rods.

An internal structural arrangement of boron carbide in the cladding tube must be provided to reduce stresses on the cladding tube by the dimensional expansion of the boron carbide.

DISCLOSURE OF THE INVENTION

The present invention contemplates fabricating boron carbide into longitudinal form.

The invention further contemplates providing an inner support tube coaxial with an outside cladding tube of a nuclear control rod.

The invention further contemplates spacing structure radially extended from the inner support tube between longitudinal boron carbide forms from the cladding tube to the inner support tube.

The invention further contemplates the specific form of the boron carbide being a segment to form a cylinder with other segments.

Other objects, advantages and features of this invention will become apparent to one skilled in the art upon consideration of the written specification, appended claims, and attached drawings.

BRIEF DESIGNATION OF THE DRAWINGS

FIG. 1 is a sectioned elevation of a nuclear control rod embodying the present invention; and FIG. 2 is a section of FIG. 1 along lines A—A.

BEST MODE FOR CARRYING OUT THE INVENTION

The present invention solves the problem generated by the increase in external dimensions of material which has a very high cross section for absorbing neutrons. At present, boron carbide is preferred for this service in control rods for nuclear reactors, but future developments may discover an even more satisfactory material that has the property of increasing in external dimensions due to irradiation.

Mechanically, the problem of increased dimensions results in the absorbent material bearing upon the inside surface of the control rod cladding. Depending upon the present space available within the cladding, mechanical force may warp the rod and even rupture the cladding.

It is a concept of the present invention to form the boron carbide into bodies with shapes which enable them to be readily loaded into the control rod cladding with spacers of the shape and proper material which will obviate the problem of mechanical force buildup on the internal surface of the cladding. The concept is not limited by the manner of forming, or the shape of the boron carbide bodies. The preferred embodiment is to form the bodies as elongated segments which can be clustered into groups of six to provide the profile of a cylinder. Of course, these segments within each cylindrical cluster are isolated from each other by layers of soft material that will take the deformation necessary to isolate the force of the expanding segments from the cladding. Additionally, a sacrificial member is extended along the axis of the cladding to further assure force isolation.

FIG. 1 is a sectioned elevation of an intermediate length of a control rod in which segments of boron carbide are mounted within the concepts of the present invention. Both the elevation of FIG. 1 and the section of FIG. 2 are to be taken together in complete disclosure of the present invention. Compatible with all control rods, cladding 1 is in the form of a tube which is traditionally fabricated of stainless steel or inconel. This tube is sealed around its contents and it is highly desirable that it not distort or rupture and release the contents within the fuel assembly into which it is reciprocated. None of the mechanism vertically actuating the control rod is shown.

Solid bodies or segments are formed of boron carbide with limited length. These segments are arranged within cladding 1 in an end-to-end relationship; however, to preserve the integrity of the cladding, the boron carbide segments are arranged in clusters of six. For example, cluster 2 of segments 3, 4, 5, 6, 7 and 8 is given the shape of a cylinder made up of these segments. Of course, there is no limitation on the number of segments making up each cluster. It may be that more or less than six will be less expensive to fabricate and mount within the cladding and be as effective as six. Also, the way in which the boron carbide material is fabricated into the desirable shape of each segment is not a limitation on the present invention. Each segment may be molded, or a cylinder may be formed and cut into the six segments disclosed for each cluster. Taking cluster 2 in combination with clusters 9 and 10, it can be seen how the clusters are stacked within the cladding after the fashion of fuel pellets within their fuel rod.

The section of FIG. 2 discloses a configuration which accommodates the swelling of the boron carbide in a manner which does not jeopardize the integrity of the cladding tube 1. The boron carbide is fabricated into segments which are grouped into cylindrical clusters that are placed in cladding tube 1 using spacers. A thin-walled support tube 11 of a material such as stainless steel is used in the center to hold the spacers and segments in place. The spacer material 12 can be a material of high absorption properties such as alloys of cadmium or silver that are soft at operating temperatures.

Upon swelling, each boron carbide segment in its cluster will exert force in all directions. The radial growth will be accommodated by deformation of inner support tube 11 which can be designed in a number of ways to be a sacrificial member. Since inner support tube 11 is fabricated with a relatively thin wall and/or slots, and is at a higher temperature than the outer cladding tube 1, the inner tube 11 will be deformed preferentially, and therefore eliminate the stress which would be exerted on cladding tube 1.

In the conventional case, swelling takes place in the outer region of the pellet or powder cylinder because of the sheilding effects of the boron carbide itself. The material is nearly incompressible and therefore exerts a high tangential stress on the cladding, once the initial gap is filled. A large gap is impractical because the powder formed in the upper regions of the boron carbide column fills the available gap below unless a compressible member is introduced as in the arrangement disclosed.

In the present disclosure, the swelling in the outer region will displace the boron carbide segments radially inward to deform the support tube with no loss of integrity to the cladding tube.

The soft spacer material 12 will accommodate swelling in the tangential direction by extruding radially into the space 13 provided between the inner support tube and the inner edge of the soft material or, into space 14 optionally provided between the soft material 12 and the cladding tube 1. Thus, the stresses on the cladding tube can be maintained to values below those allowable, and the lifetime of the control rod will not be limited by swelling of the boron carbide.

From the foregoing, it will be seen that this invention is one well adapted to attain all the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A control rod for a nuclear reactor, including,
   a tubular cladding forming the outside dimension of a control rod,
   a thin-walled inner support tube coaxial with the tubular cladding,
   a spacer material having high neutron absorption properties and softening at operating temperatures and extending between the inner support tube and the outer tubular cladding,
   and a segment formed from boron carbide to fit into the tubular cladding and supported by the inner support tube and the spacer material,
   whereby the inner support tube and spacer material between the boron carbide segments deform to permit expansion of the segment without exerting deforming force on the tubular cladding.

2. The control rod of claim 1, in which, the inner support tube is fabricated of stainless steel.

3. The control rod of claim 1, in which,
   the spacer material is fabricated from a metal of high neutron absorption properties such as an alloy of cadmium or silver.

4. The control rod of claim 1, including,
   a plurality of segments arranged in the form of a cylinder with each segment separated from adjacent segments by the spacer material.

5. The control rod of claim 4, in which,
   there are six segments clustered to form the cylinder.

* * * * *